United States Patent
Suzuki et al.

(10) Patent No.: US 9,873,406 B2
(45) Date of Patent: Jan. 23, 2018

(54) WIPER APPARATUS

(71) Applicants: Mitsuba Corporation, Kiryu-shi, Gunma (JP); Honda Motor Co., Ltd., Tokyo (JP)

(72) Inventors: Katsuyuki Suzuki, Kiryu (JP); Takeshi Kanai, Kiryu (JP); Yutaro Takahashi, Kiyru (JP); Masaaki Kimura, Kiryu (JP); Yuki Takahashi, Wako (JP); Koji Okabe, Wako (JP); Takeshi Sasaki, Wako (JP); Kazutada Sasaki, Wako (JP)

(73) Assignees: Mitsuba Corporation, Kiryu-shi, Gunma (JP); Honda Motor Co., Ltd., Tokyo (JP)

( * ) Notice: Subject to any disclaimer, the term of this patent is extended or adjusted under 35 U.S.C. 154(b) by 619 days.

(21) Appl. No.: 14/446,723

(22) Filed: Jul. 30, 2014

(65) Prior Publication Data

US 2015/0033492 A1    Feb. 5, 2015

(30) Foreign Application Priority Data

Jul. 31, 2013  (JP) ................. 2013-158490

(51) Int. Cl.
  *B60S 1/08*  (2006.01)
  *B60S 1/16*  (2006.01)
  *B60S 1/04*  (2006.01)

(52) U.S. Cl.
  CPC ............ *B60S 1/0447* (2013.01); *B60S 1/043* (2013.01); *B60S 1/0438* (2013.01); *B60S 1/0444* (2013.01)

(58) Field of Classification Search
  CPC ...... B60S 1/043; B60S 1/0441; B60S 1/0444; B60S 1/0447; B60S 1/0438; B60S 1/0436
  (Continued)

(56) References Cited

U.S. PATENT DOCUMENTS 6,027,157 A * 2/2000 Epple ................... B60S 1/0436
                                                   15/250.31
6,510,580 B1 * 1/2003 Saitou .................. B60S 1/0433
                                                    15/250.3
(Continued)

FOREIGN PATENT DOCUMENTS

DE     102005008636 A1 *  8/2006
DE   10 2009 045 338 A1    4/2011
(Continued)

OTHER PUBLICATIONS

Machine translation of description portion of EP 2610117, published Jul. 2013.*

*Primary Examiner* — Gary Graham
(74) *Attorney, Agent, or Firm* — McCormick, Paulding & Huber LLP

(57) ABSTRACT

An object of the present invention is to provide a wiper apparatus reduced in the number of parts. A wiper apparatus 40A has: a drive mechanism 13 for driving a wiper 12 for wiping a front windshield of a vehicle; a gear case 17 in which the drive mechanism 13 is housed, and which is fixed to a vehicle body, wherein the wiper apparatus 40A has: a fixing part 35 provided in the gear case 17 and fixed to the vehicle body; and a fixing part 36 provided in the gear case 17 and fixed to the vehicle body at a position different from a fixed position of the fixing part 35 in a longitudinal direction of the vehicle body.

6 Claims, 4 Drawing Sheets

(58) Field of Classification Search
USPC ...... 15/250.3, 250.31; 296/96.15, 96.17, 192
See application file for complete search history.

(56) References Cited

U.S. PATENT DOCUMENTS

| | | | | |
|---|---|---|---|---|
| 6,869,126 | B2* | 3/2005 | Schmid ................. | B60S 1/0444 |
| | | | | 15/250.29 |
| 2005/0097700 | A1* | 5/2005 | Iwata .................... | B60S 1/0488 |
| | | | | 15/250.3 |
| 2007/0226939 | A1* | 10/2007 | Takada ................. | B60S 1/0438 |
| | | | | 15/250.31 |
| 2008/0235895 | A1* | 10/2008 | Tajima ................. | B60S 1/0433 |
| | | | | 15/250.31 |
| 2009/0158546 | A1* | 6/2009 | Hawighorst .......... | B60S 1/0447 |
| | | | | 15/250.31 |

FOREIGN PATENT DOCUMENTS

| | | | |
|---|---|---|---|
| EP | 1 911 640 A1 | | 4/2008 |
| EP | 2610117 A2 | * | 7/2013 |
| FR | 2839691 | * | 11/2003 |
| FR | 2950589 | * | 4/2011 |
| FR | 2 965 232 A1 | | 3/2012 |
| GB | 2228188 A | * | 8/1990 |
| JP | 2007182200 A | | 7/2007 |
| JP | 2009-143493 A | | 7/2009 |
| JP | 2009-166682 A | | 7/2009 |
| JP | 2009166732 A | | 7/2009 |

* cited by examiner

WIPER APPARATUS

CROSS-REFERENCE TO RELATED APPLICATION

The present application claims priority from Japanese Patent Application No. 2013-158490 filed on Jul. 31, 2013, the content of which is hereby incorporated by reference into this application.

TECHNICAL FIELD OF THE INVENTION

The present invention relates to a wiper apparatus for driving a wiper for wiping a windshield provided to a vehicle.

BACKGROUND OF THE INVENTION

Conventionally, a wiper apparatus is provided for wiping a windshield of a vehicle to maintain good visibility, and one example of the wiper apparatus is described in Japanese Unexamined Patent Application Publication Nos. JP2009-143493 and JP2009-166682, the specification of French Unexamined Patent Publication No. FR2965232, and the specification of European Unexamined Patent Publication No. EP1911640. A wiper apparatus described in the above patent document JP2009-143493 has a structure referred to as so-called "dual type", and this wiper apparatus has two wiper motors for driving respective wipers, drive power of each wiper motor is transferred to a pivot shaft via a speed reduction mechanism and a link mechanism. The wipers are attached to the respective pivot shafts. Furthermore, the speed reduction mechanisms are housed in respective casings, and each casing is provided with three brackets. And, the brackets are fixed to a vehicle body with three bolts.

A dual type wiper apparatus is described in the above patent document JP2009-166682, and this wiper apparatus has wiper motors for driving respective wipers. Drive power of each wiper motor is transferred to a pivot shaft via a speed reduction mechanism and a link mechanism. The wipers are attached to the respective pivot shafts. Furthermore, the speed reduction mechanism and the link mechanism are housed in a casing, and each casing is fixed to a vehicle body with one fixing leg and two bolts.

A dual type wiper apparatus is described in the above patent documents FR002965232 and EP1911640. This wiper apparatus has a wiper motors for driving respective wipers provided separately. Drive power of each wiper motor is transferred to an output shaft of a worm wheel which constitutes a speed reduction mechanism. The wipers are attached to the respective output shafts. Furthermore, the speed reduction mechanism is housed in a casing, and each casing is fixed to a vehicle body with three bolts.

SUMMARY OF THE INVENTION

However, the casing in each of the wiper apparatuses disclosed by the patent documents JP2009-143493, JP2009-166682, and FR296523 is fixed to the vehicle body with three fixing elements. Thus, they have a problem that many parts are used to fix the casing to the vehicle body.

An object of the present invention is to provide a wiper apparatus reduced in the number of parts to be fixed to a vehicle body.

According to one aspect of the present invention, there is provided a wiper apparatus having: a drive mechanism for swinging a wiper for wiping a windshield of a vehicle; and a casing in which the drive mechanism is housed, and which is fixed to a vehicle body, wherein the wiper apparatus has: a first fixing part provided in the casing and fixed to the vehicle body; and a second fixing part provided in the casing and fixed to the vehicle body at a position different from the first fixing part in a longitudinal direction of the vehicle body.

According to another aspect of the present invention, there is provided a wiper apparatus having: a drive mechanism for swinging a wiper for wiping a windshield of a vehicle; and a casing in which the drive mechanism is housed, and which is fixed to a vehicle body, wherein the wiper apparatus has: a first fixing part provided in the casing and fixed to the vehicle body; and a second fixing part provided in the casing and fixed to the vehicle body at a position different from the first fixing part in a longitudinal direction of the vehicle body, wherein an outer edge of the first fixing part is the same in shape as an outer edge of the second fixing part.

In the wiper apparatus according to the present invention, the first fixing part is fixed to the vehicle body by using a screw member, and the second fixing part is inserted in a mounting hole provided in the vehicle body so that the second fixing part is fixed to the vehicle body.

In the wiper apparatus according to the present invention, the drive mechanism has an output shaft supporting the wiper swingably, and the output shaft is arranged between the first fixing part and the second fixing part in the longitudinal direction of the vehicle body.

In the wiper apparatus according to the present invention, an elastic member intervenes between the first fixing part and the vehicle body, or/and between the second fixing part and the vehicle body.

In the wiper apparatus according to the present invention, an outer edge of the first fixing part is the same in shape as an outer edge of the second fixing part.

According to still another aspect of the present invention, there is provided a wiper apparatus for swinging a wiper for wiping a windshield of a vehicle, comprising: an electric motor which outputs drive power to the wiper via an armature; a rotating body which is rotated by the drive power from the armature; a casing in which the rotating body is rotatably housed; an output shaft which is provided in the casing and rotated integrally with the rotating body, wherein one end part of the output shaft is exposed on the outside of the casing and connected to the wiper; and a pair of fixing parts which is integrally formed as part of the casing and fixed to a vehicle body, wherein outer edges of the fixing parts are the same in shape as each other, one of the fixing parts is inserted in a mounting hole provided in the vehicle body, and the other of the fixing parts is fixed to the vehicle body by a screw member via a grommet, and the fixing parts are extends in a direction perpendicular to the output shaft when viewed from the side of the casing.

According to the present invention, it is possible to reduce the number of parts for fixing the wiper apparatus to the vehicle body.

DESCRIPTION OF THE PREFERRED EMBODIMENTS

Figure 1:
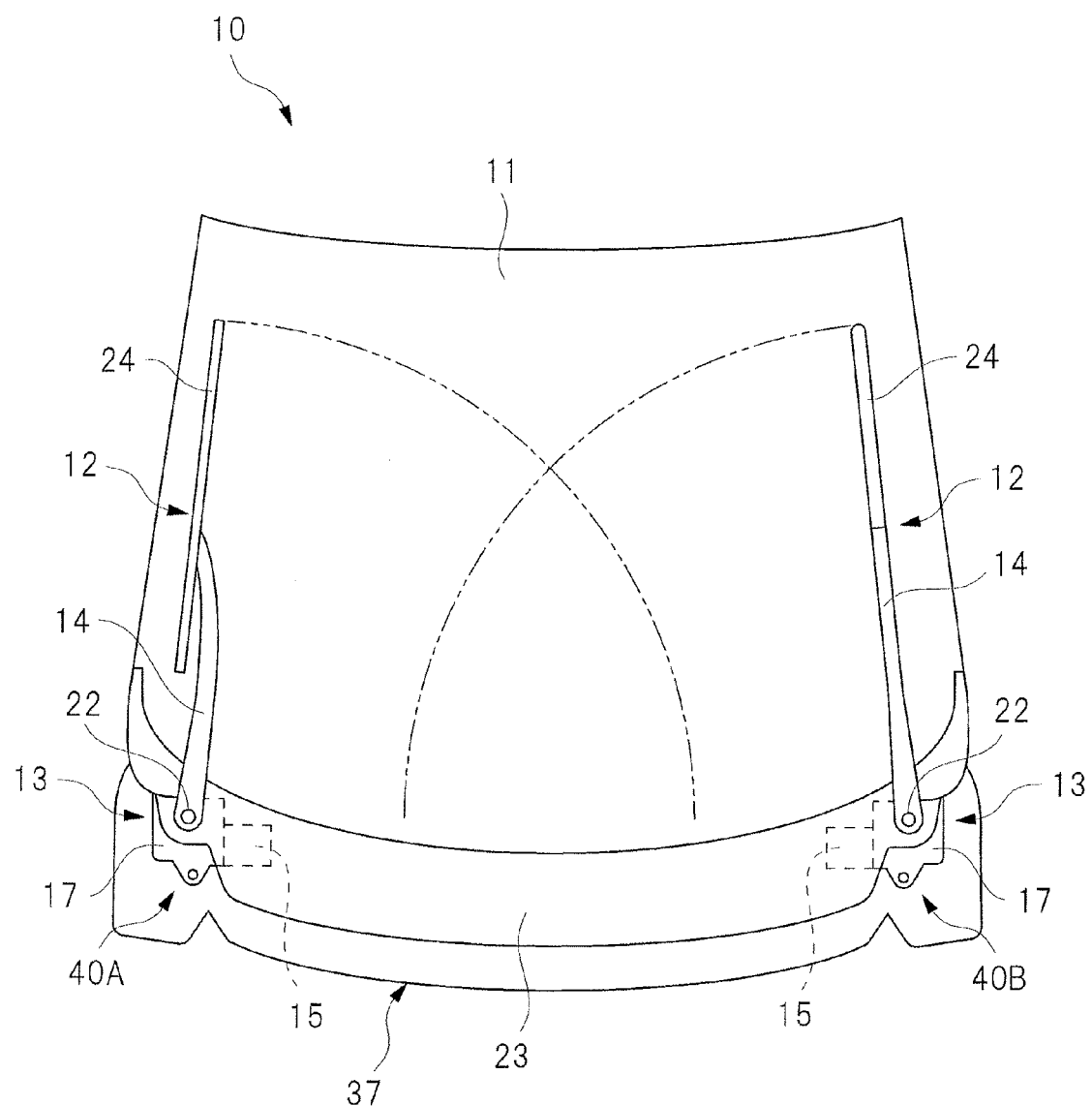
FIG. 1 is a conceptual diagram showing a vehicle provided with a wiper apparatus according to the present invention.

Hereinafter, one embodiment of the present invention will be described in detail on the basis of the drawings. A vehicle 10 shown in FIG. 1 has two sets of wiper apparatuses 40A and 40B for wiping a front windshield 11. When viewed from the front side of the vehicle 10, the wiper apparatus 40A is arranged in the left side part of the vehicle 10, and the wiper apparatus 40B is arranged in the right side part of the vehicle. Since the wiper apparatuses 40A and 40B have a bilaterally symmetrical structure when viewed from the front side of the vehicle 10, the wiper apparatus 40A will be described on behalf of them in the following description.

Figure 2:
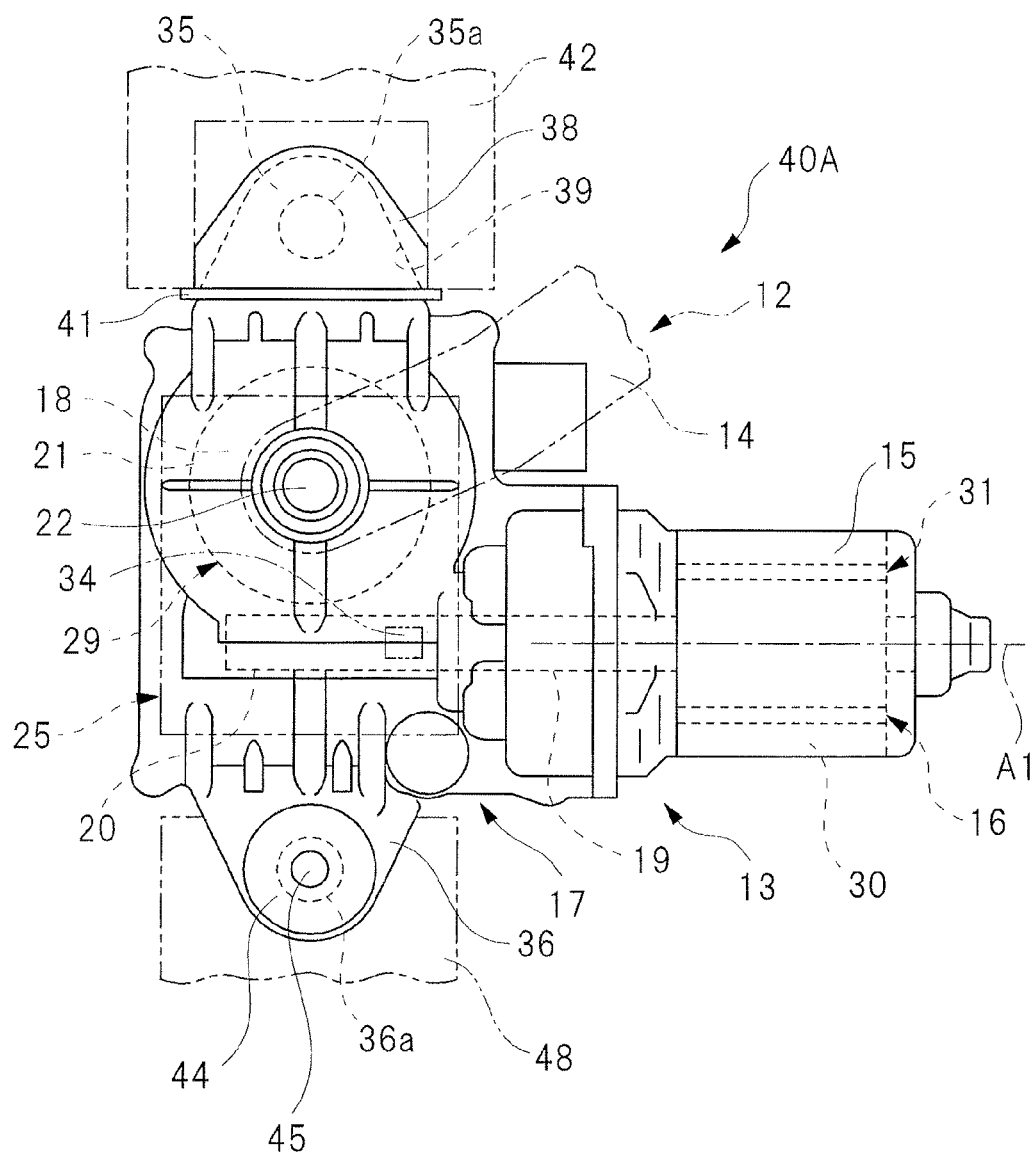
FIG. 2 is a plan view showing the wiper apparatus of FIG. 1.

The wiper apparatus 40A has a wiper 12 and a drive mechanism 13. The wiper 12 has a wiper arm 14 and a wiper blade 24 attached to the wiper arm 14. Furthermore, the drive mechanism 13 has an electric motor 16 and a speed reduction mechanism 29 as shown in FIG. 2. The electric motor 16 has a yoke 15, a permanent magnet 30 fixed to an inner circumference surface of the yoke 15 and an amateur 31 provided rotatably inside the yoke 15. The armature 31 has an armature shaft 19 and a coil attached to the armature shaft 19. A commutator connected to the coil is provided to the armature shaft 19.

Furthermore, a brush through which electric power is supplied to the coil is provided in the yoke 15. The electric motor 16 can rotate the armature 31 in a forward/backward direction by switching a direction of electric current flowing through the coil. A center line "A1" defined as a rotation center of the armature 31 extends in a right-left direction, that is, a width direction of the vehicle 10. That is, the drive mechanism 13 is arranged so that the armature shaft 19 extends along a right-left direction, that is, a width direction of the vehicle 10.

The yoke 15 is fixed to a gear case 17, and an opening of the gear case 17 is covered with a cover 33. The gear case 17 is integrally molded from metallic material, resin material, or the like. A worm 20 is formed on an outer circumference of the armature shaft 19. In the armature shaft 19, a portion formed with the worm 20 is housed in the gear case 17. Furthermore, a worm wheel 18 is provided rotatably inside the gear case 17, and a gear 21 is formed on the outer circumference of the worm wheel 18. The worm 20 and the gear 21 are engaged with each other, and the speed reduction mechanism 29 is formed of the worm 20 and the gear 21. That is, the speed reduction mechanism 29 is housed in the gear case 17.

An output shaft 22 coaxial with the worm wheel 18 is provided, and the worm wheel 18 and output shaft 22 rotate integrally when drive power of the electric motor 16 is transferred to the worm wheel 18. One end part of the output shaft 22 is exposed to the outside of the gear case 17.

A cowl cover 23 made up from metal or resin is provided on the front side of the front windshield 11. The cowl cover 23 is arranged in the width direction of the vehicle 10 along the edge of the front windshield 11. The drive mechanism 13 is provided below the cowl cover 23, and the tip end of the output shaft 22 is arranged above the cowl cover 23. Note that, "above" denotes an outside direction of the vehicle 10, and "below" denotes an inside direction of the vehicle 10.

In the output shaft 22, the wiper arm 14 is connected to a part arranged above the cowl cover 23. The wiper arm 14 is directly connected to the output shaft 22, and a link mechanism is not provided. Therefore, the wiper 12 is swingable, i.e., reciprocatably movable within a predetermined range with the output shaft 22 as the center. That is, the output shaft 22 functions as a pivot shaft, and the output shaft 22 supports the wiper 12 swingably. When the wiper 12 operates reciprocally, the wiper blade 24 wipes a wiped surface, i.e., the surface of the front windshield 11.

A control board 25 is provided in a space surrounded with the gear case 17 and the cover 33. More specifically, the control board 25 is provided between the worm wheel 18 and the cover 33. A controller is provided in this control board 25. The control board 25 has an inverter circuit, a PWM control circuit, a current detection circuit, a storage circuit, and the like. Furthermore, on the control board 25, a sensor 34 which detects the rotation angle and the number of rotations or the like of the armature shaft 19 is provided, and an output signal of the sensor 34 is inputted into the controller. The sensor 34 includes a well-known Hall IC or the like.

Note that, the wiper apparatus 40B is constituted in the same way as the wiper apparatus 40A, and a control system for driving the wiper apparatus 40B is also constituted in the same way as the control system for driving the wiper apparatus 40A. Therefore, wiper apparatuses 40A and 40B can be driven independently. In this way, wiper apparatuses 40A and 40B have a structure referred to as a so-called "dual direct type".

Next, a attaching structure of the wiper apparatuses 40A and 40B to the vehicle body 37 will be described. Note that, since the wiper apparatuses 40A and 40B have a bilaterally symmetrical shape when viewed from the front side of the vehicle 10, a attaching structure of the wiper apparatus 40A will be described as an example, for convenience. A pair of mount sections 35 and 36 is provided in the gear case 17. The mount section 35 of one side is extended, in the gear case 17, from the end part in the rearward direction of the vehicle body 37 toward the rearward direction. The mount section 36 of the other side is extended, in the gear case 17, from the end part in the frontward direction of the vehicle body 37 toward the frontward direction. In FIG. 2 where the gear case 17 is viewed planarly, the output shaft 22 is arranged between two mount sections 35 and 36 in the longitudinal direction of the vehicle body 37.

Mounting holes 35a and 36a are provided in the mount sections 35 and 36, respectively. The mounting hole 35a is formed so as to penetrate the mount section 35 in the direction along the center line "B1" of the output shaft 22, and the mounting hole 36a is also formed so as to penetrate the mount section 36 in the direction along the center line "B1". When the gear case 17 is viewed planarly, the centers of the mounting holes 35a and 36a and the center of the output shaft 22 are arranged on the same straight line. The straight line is arranged along with the longitudinal direction of the vehicle body 37. That is, the mounting holes 35a and 36a are arranged at respective positions which are different from each other in the longitudinal direction of the vehicle body 37.

Furthermore, when the gear case 17 is viewed planarly as shown in FIG. 2, the outer edges of the mount sections 35 and 36 are approximately symmetric with respect to the longitudinal direction of the output shaft 22. That is, an outer edge of the mount section 35 is the same in shape as an outer edge of the mount section 36. Furthermore, the shapes of the mounting holes 35a and 36a are approximately symmetric. Furthermore, when the gear case 17 is viewed from the side as shown in FIG. 3, the shapes of the mount sections 35 and 36 are symmetric in both sides of the output shaft 22.

The mount section 35A is covered with a mount rubber 38. The mount rubber 38 is formed with a depressed portion 39, and the mount section 35 is inserted in the depressed portion 39. The mount rubber 38 is formed with a flange 41 which surrounds the open end of the depressed portion 39. On the other hand, a bracket 42 is provided to a panel which constitutes the vehicle body 37, and the bracket 42 is provided with a supporting hole 43. The supporting hole 43 has the shape of a quadrangle as will be seen in side view and plan view. The mount rubber 38 and the mount section 35 are inserted in the supporting hole 43. While the flange 41 is in contact with the bracket 42, the mount rubber 38 is positioned with respect to the bracket 42 in the longitudinal direction of the vehicle body 37.

Furthermore, a grommet 44 is attached to the mount section 36. The grommet 44 is integrally molded with a rubbery elastic body, and part of the grommet 44 is arranged in the mounting hole 36a formed in the mount section 36, and the grommet 44 is fixed to the mount section 36. When the gear case 17 is viewed planarly, the grommet 44 has a circular outer peripheral portion, and a circular shaft hole 45 is provided at the center of the grommet 44. A shaft portion 47 of a bolt 46 is inserted in the shaft hole 45. A bracket 48 is provided to the panel which constitutes the vehicle body 37, and the mount section 36 is fixed to the vehicle body 37 with the bolt 46 fastened. A nut 49 in which the shaft portion 47 of the bolt 46 is screwed may be fixed by welding to the bracket 48, and may not be fixed to the bracket 48. Note that, the mount section 36 may be fixed directly to the bracket 48 without attaching the grommet 44 to the mount section 36.

Figure 3:
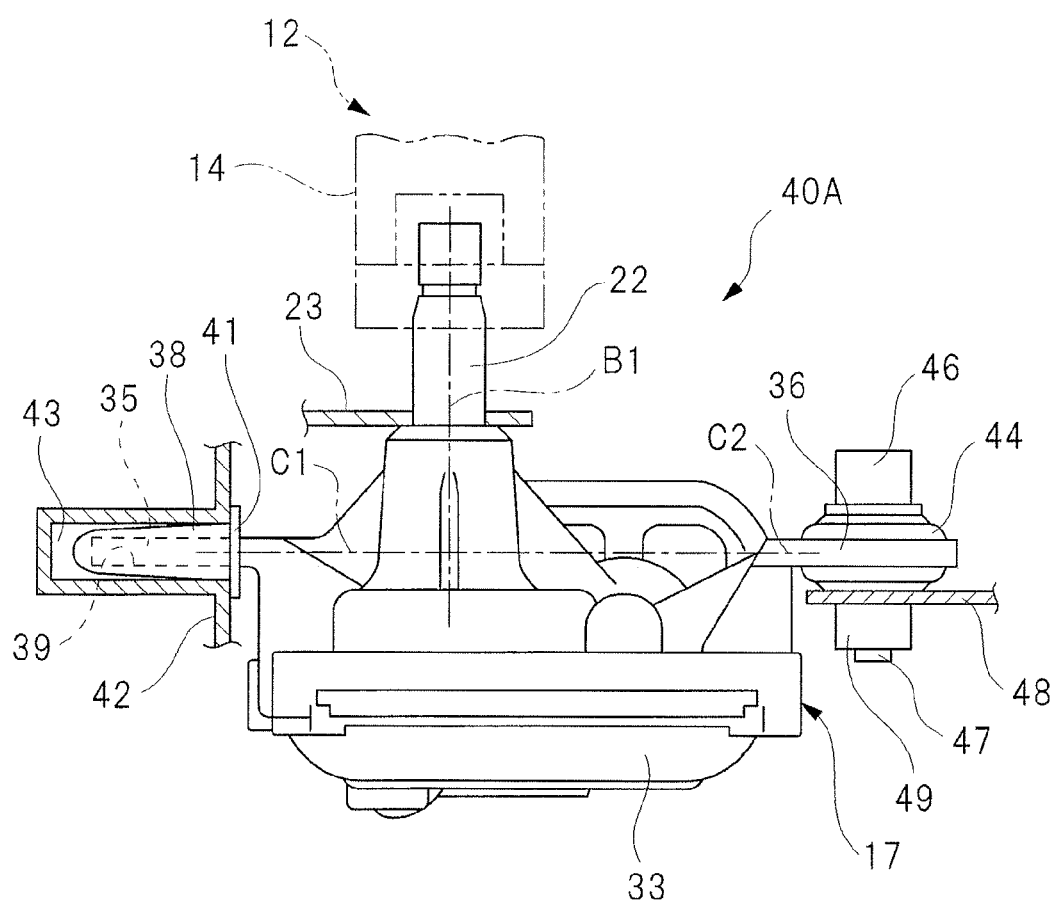
FIG. 3 is a side view showing the wiper apparatus of FIG. 1.

In FIG. 3 where the wiper apparatus 40A is viewed from the side, an angle made by the center line "B1" of the output shaft 22 and a center line "C1" of the mount section 35 is a right angle approximately, and an angle made by the center line "B1" of the output shaft 22 and a center line "C2" of the mount section 36 is a right angle approximately. Note that, an example where the center line "C1" and the center line "C2" are located on a straight line is shown in FIG. 3. Furthermore, in FIG. 3, although the center line "B1" is arranged in parallel with a vertical line (not shown) for convenience, the wiper apparatus 40A, practically, is attached to the vehicle body 37 in a state where the center line "B1" and the vertical line intersect.

Furthermore, the position of the mount section 35 is in agreement with the position of the mount section 36 in the direction of the center line "B1". That is, the center line "C1" and the center line "C2" are located on a straight line so that heights of the mount section 35 and the mount section 36 with respect to the gear case 17 in the direction of the center line "B1" may become approximately the same as each other with the center line "C1" and the center line "C2" extending in a horizontal direction. The above-mentioned direction of the center line "B1" is the same as the axial direction of the output shaft 22.

As mentioned above, in the wiper apparatus 40A, the mount section 36 is fixed to the vehicle body 37 with the bolt 46 and the nut 49. Furthermore, the mount section 35 and the mount rubber 38 are inserted together in the supporting hole 43 of the bracket 42, and the mount section 35 is fixed to the vehicle body 37. Therefore, when the wiper apparatus 40A is viewed planarly as shown in FIG. 2, the wiper apparatus 40A can be prevented from moving in a horizontal direction. Furthermore, when the wiper apparatus 40A is viewed from the side as shown in FIG. 3, the wiper apparatus 40A can be prevented from moving in the vertical direction of the vehicle body 37 and in the longitudinal direction of the vehicle body 37.

Furthermore, since the wiper apparatus 40A is attached to the vehicle body 37 via the two mount sections 35 and 36, the number of parts for fixing the wiper apparatus 40A to the vehicle body 37 can be reduced. Furthermore, the wiper apparatus 40A can be fixed to the vehicle body 37 by a process that the two mount sections 35 and 36 are attached to the vehicle body 37, and workability of a worker can be improved. Furthermore, the wiper apparatus 40A is attached to the vehicle body 37 via the two mount sections 35 and 36. Therefore, interference between the wiper apparatus 40A and parts located around it can be avoided. Furthermore, flexibility of an arrangement layout of the wiper apparatus 40A in the vehicle body 37 can be improved, and the internal space of the vehicle body 37 can be used effectively.

Furthermore, when the grommet 44 is attached to the mount section 35, and the mount rubber 38 is attached to the mount section 36, the wiper apparatus 40A can be used as the wiper apparatus 40B arranged in the right-hand side, and can be fixed to the vehicle body 37. That is, the wiper apparatuses 40A and 40B can be used commonly in the left and right, and a manufacturing cost for forming a metal mold, and a part management cost or the like are not increased, and a manufacturing cost of the wiper apparatuses 40A and 40B can be reduced. Furthermore, the mount rubber 38 intervenes between the bracket 42 and the mount section 35, and the grommet 44 intervenes between the bracket 48 and the mount section 36. Therefore, vibration caused by an operation of the electric motor 16 can be attenuated by an attenuation capability of the mount rubber 38 and the grommet 44, and an operating sound of the electric motor 16 can be reduced.

Furthermore, as for the wiper apparatus 40A, the output shaft 22 has a function as a pivot shaft, and the link mechanism which connects the output shaft 22 and the wiper arm 14 is not provided. Therefore, the number of parts of the wiper apparatus 40A can be reduced, and weight saving of the wiper apparatus 40A can be achieved. Note that, the same effect as the wiper apparatus 40A can be acquired also in the wiper apparatus 40B.

Next, operation and control of the wiper apparatuses 40A and 40B will be described. As for the wiper 12, when a wiper switch is turned off, the wiper 12 is stopped at an initial position determined in advance. When the wiper 12 is stopped at the initial position, the wiper blade 24 is in contact with the upper surface of the cowl cover 23.

On the other hand, when the wiper switch is turned on, and electric power of a power source is supplied to the electric motor 16, a direction of electric current which flows through a coil of the electric motor 16 is switched, and the armature shaft 19 rotates in a forward/backward direction within the range of a prescribed rotation angle. A torque of the armature shaft 19 is transferred to the output shaft 22 via the worm wheel 18. The worm 20 and the gear 21, when the torque of the armature shaft 19 is transferred to the output shaft 22, function as the speed reduction mechanism which reduces a rotation speed of the worm wheel 18 against the rotation speed of the armature shaft 19.

When the worm wheel 18 is rotated in a forward/backward direction, the torque of the output shaft 22 is transferred to the wiper 12, and the wiper 12 is swung between a predetermined lower reversing position and a predetermined upper reversing position, and the front windshield 11 is wiped by the wiper blade 24.

Figure 4:
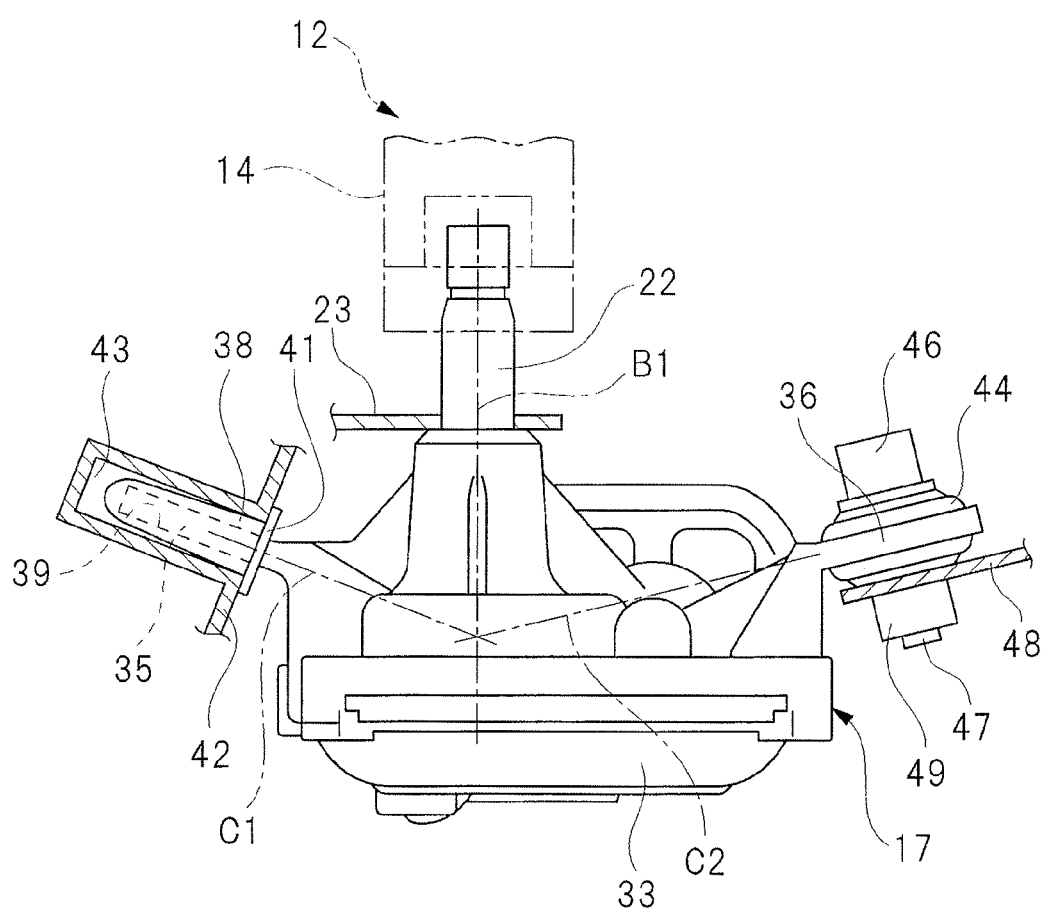
FIG. 4 is a side view showing another structural example of the wiper apparatus of FIG. 1.

Other constructional examples of the gear case 17 will be described on the basis of FIG. 4. When the gear case 17 shown in FIG. 4 is viewed from one side, an angle made by the center line "B1" and a center line "C1" on the same side as the wiper 12 is smaller than 90 degrees, and an angle made by the center line "B1" and a center line "C2" on the same side as the wiper 12 is smaller than 90 degrees. In FIG. 4, other configurations of the wiper apparatus 40A are the same as those of the wiper apparatus 40A shown in FIGS. 2 and 3. When the mount rubber 38 is attached to the mount section 36, the grommet 44 is attached to the mount section 35, and the mount section 35 is fixed with bolts to the vehicle body 37, the wiper apparatus 40A of FIG. 4 can be used as the wiper apparatus 40B. When the wiper apparatus 40A having a structure shown in FIG. 4 is used as the wiper apparatus shown in FIG. 1, the same effect as that of the wiper apparatus 40A shown in FIG. 2 can be obtained.

Furthermore, an angle made by the center line "B1" and the center line "C1" may be no less than 90 degrees, and an angle made by the center line "B1" and the center line "C2" may be no less than 90 degrees. Furthermore, one of an angle made by the center line "B1" and the center line "C1" and an angle made by the center line "B1" and the center line "C2" may be smaller than 90 degrees, and the other may be no less than 90 degrees. Furthermore, the position of the mount section 35 is the same as that of the mount section 36 in the direction of the center line "B1". That is, with respect to the gear case 17, the height of the mount section 35 is approximately the same as that of the mount section 36 in the direction of the center line "B1".

The front windshield 11 corresponds to a windshield in the present invention, the gear case 17 corresponds to a casing in the present invention, the mount section 36 corresponds to a first fixing part in the present invention, the bolt 46 corresponds to a screw member in the present invention, the mount section 35 corresponds to a second fixing part in the present invention, the depressed portion 39 corresponds to a mounting hole in the present invention, the mount rubber 38 and the grommet 44 correspond to an elastic member in the present invention, and the worm wheel 18 corresponds to a rotating body in the present invention.

The present invention is not limited to the above-mentioned embodiment, and it is needless to say that the present invention can be modified variously in the range without departing from the substance. The driving apparatus of the present invention may include a structure in which, among two mount sections, the mount section located frontward is fixed to the vehicle body with an insertion structure, and the mount section located rearward is fastened and fixed with a bolt. Furthermore, when the wiper apparatus is viewed planarly, a straight line passing through a center between two mounting holes and a center of the output shaft may intersect each other with respect to a longitudinal direction of a vehicle. That is, an axial direction of the armature shaft of the drive mechanism may be arranged while intersecting the width direction of the vehicle. Furthermore, a side shape and planar shape of the supporting hole provided in the bracket are not limited to the above-mentioned quadrangle.

Furthermore, the drive mechanism 13 of the present invention is not limited to a structure in which the speed reduction mechanism 29 is provided in the casing, and the output shaft 22 is provided directly in the gear 21 engaged with the worm 20, and may include a speed reduction mechanism using a link mechanism in the casing. Furthermore, the electric motor for driving a wiper may be any of a motor with a brush or without a brush. Furthermore, the windshield to be wiped by the wiper may include a rear glass besides a front windshield. Furthermore, the fixing part in the present invention may include a projecting part besides mount sections.

INDUSTRIAL APPLICABILITY

The present invention can be used as a wiper apparatus for driving a wiper for wiping a windshield provided to a vehicle.

What is claimed is:

1. A wiper apparatus having: a drive mechanism for swinging a wiper for wiping a windshield of a vehicle; and a casing in which the drive mechanism is housed and an output shaft is provided, and which is fixed to a vehicle body,
   wherein the wiper apparatus has a pair of fixing parts:
   a first fixing part provided in the casing and fixed to the vehicle body; and
   a second fixing part provided in the casing and fixed to the vehicle body at a position different from the first fixing part in a longitudinal direction of the vehicle body,
   wherein an outer edge of the first fixing part is the same in shape as an outer edge of the second fixing part, and
   mounting holes are provided in the first fixing part and in the second fixing part respectively, and
   the center of the mounting hole of the first fixing part, the center of the mounting hole of the second fixing part, and the output shaft are located on a straight line when viewed from a direction of the output shaft.

2. The wiper apparatus according to claim 1, wherein the first fixing part is fixed to the vehicle body by using a screw member, and
   the second fixing part is inserted in a mounting hole provided in the vehicle body so that the second fixing part is fixed to the vehicle body.

3. The wiper apparatus according to claim 2, wherein the drive mechanism has an output shaft supporting the wiper swingably, and
   the output shaft is arranged between the first fixing part and the second fixing part in the longitudinal direction of the vehicle body.

4. The wiper apparatus according to claim 3, wherein an elastic member intervenes between the first fixing part and the vehicle body, or/and between the second fixing part and the vehicle body.

5. The wiper apparatus according to claim 2, wherein an elastic member intervenes between the first fixing part and the vehicle body, or/and between the second fixing part and the vehicle body.

6. A wiper apparatus for swinging a wiper for wiping a windshield of a vehicle, comprising:
   an electric motor which outputs drive power to the wiper via an armature;
   a rotating body which is rotated by the drive power from the armature;
   a casing in which the rotating body is rotatably housed;
   an output shaft which is provided in the casing and rotated integrally with the rotating body, wherein one end part of the output shaft is exposed on the outside of the casing and connected to the wiper; and
   a pair of fixing parts which is integrally formed as part of the casing and fixed to a vehicle body, wherein
   outer edges of the fixing parts are the same in shape as each other,
   one of the fixing parts is inserted in a mounting hole provided in the vehicle body, and the other of the fixing parts is fixed to the vehicle body by a screw member via a grommet, and
   the fixing parts extend in a direction perpendicular to the output shaft when viewed from the side of the casing, and mounting holes are provided in the respective fixing parts, and the center of the mounting hole of one of the fixing parts, the center of the mounting hole of the other of the fixing parts, and the output shaft are located on a straight line when viewed from a direction of the output shaft.

* * * * *